United States Patent Office 3,189,567
Patented June 15, 1965

3,189,567
PROCESS FOR VULCANIZATION OF BUTYL RUBBER
Arnold Giller, Wiesbaden, Germany, assignor to Chemische Werke Albert, Wiesbaden-Biebrich, Germany, a corporation of Germany
No Drawing. Filed June 20, 1960, Ser. No. 37,111
Claims priority, application Germany, July 17, 1959, C 19,413
5 Claims. (Cl. 260—19)

This invention relates to a process for vulcanizing butyl rubber compositions with the aid of phenol resins as the vulcanizing agents in the presence of substances which give off a halogen or a hydrogen halide under the compounding conditions and of certain metal oxides or certain metal halides or metal salts of organic acids.

A number of processes are known whereby natural rubber or synthetic rubber elastomers may be cross-linked in the sense of vulcanization.

For example, in French Patent No. 861,306 it is disclosed that natural rubber and butadiene-acrylonitrile synthetic elastomers can be vulcanized with the aid of phenol resins and that the vulcanizing effect of these phenol resins is enhanced by the addition of metal oxides and/or fillers to the vulcanizable mixture.

Further, Austrian Patents Nos. 162,570 and 165,035 disclose that trivalent phenols, such as pyrogallol and phloroglucinol, may be used as vulcanizing agents for the vulcanization of butadiene-styrene copolymer synthetic elastomers, and that this vulcanizing action can be accelerated by the addition of aromatic amines or small amounts of metal halides, such as $SnCl_4$, $FeCl_3$ and $AlCl_3$, to the vulcanizable elastomer composition.

However, none of the above prior art processes has acquired any practical importance because they require very long vulcanization periods and the vulcanizates obtained thereby exhibit unsatisfactory properties for commercial use.

In the special case of vulcanizing butyl rubber compositions containing fillers, the employment of phenol resins as vulcanizing agents has produced substantially more favorable results because the vulcanization can be considerably accelerated by the addition of aluminum halides or heavy metal halides, as described in German Patent No. 1,013,420.

Butyl rubber, as is well known, is the type of synthetic rubber made by copolymerizing an isoolefin, usually isobutylene, with a minor portion of a multi-olefinic unsaturate having from 4 to 14 carbon atoms per molecule. The isoolefins used generally have from 4 to 7 carbon atoms, and such isomonoolefins as isobutylene or ethyl methyl ethylene are preferred. The multi-olefinic unsaturate usually is an aliphatic conjugated diolefin having from 4 to 6 carbon atoms, and is preferably isoprene or butadiene. Other suitable diolefins that may be mentioned are such compounds are piperylene; 2,3-dimethyl-butadiene-1,3; 1,2-dimethyl-butadiene-1,3; 1,3-dimethyl-butadiene-1,3; 1-ethyl-butadiene-1,3; and 1,4-dimethyl-butadiene-1,3. The butyl rubber contains only relatively small amounts of copolymerized diene, typically from about 0.5 to 5%, and seldom more than 10%, on the total weight of the elastomer. For the sake of convenience and brevity, the various possible synthetic rubbers within this class will be designated generally by the term "butyl rubber."

The terms "phenol resins" used in connection with the above discussion of the prior art is intended to embrace those resins which are obtained by condensation of p-substituted phenols with formaldehyde under alkaline conditions. They are hereinafter referred to as "substituted phenol resins."

While the metal halides have a very good accelerating effect upon the vulcanization of butyl rubber, they make it more difficult to work the elastomer mixture on mixing rolls. For instance, after adding the metal halides to the elastomer composition the rolled sheet tends to stick to the rolls. Moreover, the considerable corrosive effect of the metal halides upon the rolls is another serious problem (see Bulletin No. 100–4, Thiokol Chemical Corporation, January 1958).

According to German Patents Nos. 935,283, 1,004,371 and 1,013,419, these difficulties may be eliminated by adding to the butyl rubber composition comprising a substituted phenol resin vulcanizing agent a halogen-containing substance, such as a chlorosulfonated polyethylene, chloroprene polymers or chloroparaffin, as well as heavy metal oxides or heavy metal salts of fatty acids which serve as activators for the halogen-containing substance, instead of the metal halides. Such halogen-containing substances are commercially available, for example, chlorosulfonated polyethylene is sold under the name "Hypalon" and chloroprene polymers are sold under the name "Neoprene." However, the vulcanization-accelerating effect of these halogen-containing substances, even when activated by the heavy metal oxides or the heavy metal salts, is considerably less than the accelerating effect of the metal halides. Consequently, higher vulcanization temperatures or longer vulcanization periods are required to achieve a satisfactory vulcanization effect.

I have now discovered that the vulcanization of butyl rubber compositions with substituted phenol resins in the presence of halogen-containing substances and heavy metal oxides or heavy metal salts of organic acids can surprisingly be further accelerated by storing or rolling the butyl rubber compositions at temperatures above 120° C. after the heavy metal salts or heavy metal oxides and the halogen-containing substances are added to the elastomer composition, but before the substituted phenol resin vulcanizing agent has been added. The duration of this heat treatment depends upon the concentration of the halogen-containing substances and the heavy metal compounds in the elastomer composition, upon the ability of the halogen-containing substances to split off halogen or hydrogen halide at temperatures above 120° C. and finally upon the temperature of the heat treatment. In general, the heat treatment in accordance with the present invention is applied for about 2 to 20 minutes at temperatures of about 120 to 220° C. For example, if the halogen-containing substance is polyvinyl chloride, temperatures of 180 to 200° C. are required, whereas substantially lower temperatures are sufficient with other halogen-containing substances.

The same effect is achieved by working the halogen-containing substance and the heavy metal activator into the composition at a temperature above 120° C., allowing the mixture to cool and then incorporating the substituted phenol resin vulcanizing agent into the cool elastomer on cooled mixing rolls.

Halogen-containing substances which are suitable for use in the improved process according to the present invention are all those halogenated polymers which release halogen or hydrogen halide in sufficient quantity under the heat treatment conditions. Specific examples of such halogenated polymers are halogenated vinyl polymers or copolymers, such as the commercial polyvinyl chlorides of the "Vinoflex" series or the vinyl chloride vinyl acetate copolymers sold under the name "Vinnol," which may, in addition, comprise maleic acid; also chloroprene polymers, chloroparaffins, chlorosulfonated polyethylene and halogenated butyl rubber (halogenated butene-diolefin copolymers), such as "MD-551" with a Cl-content of 1.2%, or "Hycar 2202."

Suitable heavy metal oxides and heavy metal salts for use as activators in the process according to the present invention are, for example, zinc stearate, iron stearate, zinc formate, iron formate, zinc oxide, iron oxide and the analogous salts and oxides of other heavy metals.

The amount of halogen-containing substance and heavy metal compound to be added to the butyl rubber elastomer depends largely upon the halogen content or metal content, respectively, of these additives and upon the readiness or ease with which the halogen-containing substance releases the halogen or hydrogen halide. In general, that amount of heavy metal compound and halogen-containing substance should be added which would theoretically be enough to form 1 part of the corresponding metal halide per 100 parts of butyl rubber. Greater or lesser amounts may, of course, also be used. The ratio of heavy metal compound to halogen-containing substance may also be varied within wide limits so that either the heavy metal content exceeds the theoretical halogen content in the elastomer or vice-versa. The most favorable ratio must in each case be determined by preliminary tests and depends largely upon the desired properties of the vulcanized product.

The amount of substituted phenol resin in the vulcanizable butyl rubber composition according to the present invention may range between 1 and 20 parts by weight, and preferably from 2 to 15 parts by weight, per 100 parts by weight of butyl rubber.

The butyl rubber compositions are advantageously vulcanized at a temperature between 130 and 200° C., but preferably between 140 and 160° C.

In place of the p-octyl-phenol resin specifically illustrated below, other p-substituted phenol-formaldehyde resins which are customarily recognized by the rubber art as equivalents may be employed. Thus, the p-substituent on the phenol molecule may also be alkyl with 3 or more carbon atoms, aryl, aralkyl or cycloalkyl.

The process according to the present invention is not anticipated by the prior art acknowledged above which discloses the concurrent use of polychloroprene, chlorosulfonated polyethylene or chlorinated paraffins and zinc compounds. These prior processes merely disclose that the vulcanization is accelerated by the halogen-containing substances and that the zinc compounds merely have an activating effect. Such a disclosure does not convey the concept that the halogen-containing substances enter into a chemical exchange with heavy metal compounds or the butyl rubber.

The satisfactory effect of the vulcanization process according to the present invention can, however, only be explained by chemical changes, the exact mechanism of which is as yet unknown. It is undoubtedly due to an increase in the reactivity of the butyl rubber copolymer, probably by the formation of strongly polar, labile addition products or complex compounds containing heavy metal and/or halogen, whereby the rapid vulcanization of the butyl rubber mixture with the aid of substituted phenol resins becomes possible.

In comparison with the prior art processes, the process according to the invention represents a considerable technical advance. First, its performance avoids all of the disadvantages which must ordinarily be accepted in connection with the use of metal chlorides in vulcanization procedures. Secondly, it achieves substantially better vulcanization effects than the prior art processes which employ polychloroprene, chlorinated paraffins or chlorosulfonated polyethylene together with metal compounds for the vulcanization of elastomers. Furthermore, it makes it possible to use as the required additives relatively inexpensive materials which are also useful for other purposes in the rubber industry and which are always available in uniform quality, as are zinc oxide, zinc stearate and chlorosulfonated polyethylene. By proper temperature control during compounding of the vulcanizable butyl rubber composition, good uniformity can be achieved.

The process according to the invention may, for example, be used in the manufacture of heater hose, tires and other industrial and domestic rubber goods.

The following examples will further illustrate the invention and enable others skilled in the art to understand it more completely. The quantities of the various ingredients in the compositions are given in parts by weight. The samples of the vulcanized products on which the tests for determination of their physical properties were made were standard 6 mm. test rings. The substituted phenol resin which was used as the vulcanizing agent was produced by condensation of p-octylphenol with formaldehyde in alkaline solution.

EXAMPLE I

This example will illustrate that vulcanized butyl rubber compositions with excellent physical properties are obtained when, for the purpose of accelerating the vulcanization, polyvinyl chloride and zinc oxide are added to the base composition and the resulting mixture is rolled for 5 minutes at 190 to 195° C. prior to adding the substituted phenol resin vulcanizing agent. The example also demonstrates that the degree of vulcanization can be influenced by varying the amounts of polyvinyl chloride and zinc oxide in the vulcanizable mixture.

The following five butyl rubber compositions (I, II, III, IV and V) were prepared:

*Table I*

| Component | Amount of component (parts by weight) in composition— | | | | |
|---|---|---|---|---|---|
| | I | II | III | IV | V |
| Butyl rubber (Enjay 365) [1] | 100.0 | 100.0 | 100.0 | 100.0 | 100.0 |
| Channel black | 60.0 | 60.0 | 60.0 | 60.0 | 60.0 |
| Stearic acid | 1.0 | 1.0 | 1.0 | 1.0 | 1.0 |
| Substituted phenol resin (Alresen) [2] | 6.0 | 6.0 | 12.0 | 6.0 | 6.0 |
| Polyvinyl chloride (Vinoflex 626) [3] | 4.0 | 3.0 | 4.0 | 4.0 | 4.0 |
| Zinc oxide, active | 1.1 | 1.1 | 1.1 | 0.8 | 5.0 |

[1] "Enjay 365" is a non-staining butene-isoprene copolymer having 2.1 to 2.5 mol percent unsaturation.
[2] "Alresen" is an octylphenol resin. It is prepared in the following manner: 206 gm. p-octylphenol are dissolved in 400 gm. of a 10% aqueous sodium hydroxide solution at 80 to 90° C., the resulting solution is cooled to 60° C. and then 40 to 60 gm. of formaldehyde in the form of a 30% aqueous formaldehyde solution are added thereto. The resulting mixture is subjected to condensation at elevated temperatures until all of the formaldehyde has condensed with the octylphenol (3 to 4 hours), cooled, neutralized with dilute sulfuric acid and washed with water until free from sulfates. The salt- and sulfate-free residue is then dehydrated in vacuo at 80° C. and transformed into a solid resin by heating under atmospheric pressure to 150° C.
[3] "Vinoflex 626" is a brand of polyvinyl chloride.

To compound the above compositions, the butyl rubber was rolled into a smooth sheet on cooled mixing rolls and the stearic acid, the channel black, the polyvinyl chloride and the zinc oxide were worked into the sheet. The butyl rubber mixture was then removed from the mixing rolls, the rolls were heated to 185° C. and the rubber mixture was again rolled on the heated rolls. After about 2 minutes the temperature of the mixture reached 190° C. and rose to about 195° C. in the course of the subsequent 5 minutes. At the end of this period the sheet was cut from the mixing rolls while still hot and was allowed to cool. Thereafter, the substituted phenol resin was worked into the sheet on cold mixing rolls and the resulting vulcanizable composition was vulcanized in a heated press at 154° C. in the usual manner for periods ranging from 15 to 45 minutes.

Samples were taken from each vulcanizate and these samples were subjected to the standard tests to determine their physical properties. The following table shows the values obtained from each sample:

As a preliminary step to compounding compositions VI and VII, a preliminary mixture of 100.0 parts by

Table II

| Physical properties | Composition |  |  |  |  |  |  |  |  |  |  |  |  |  |  |
|---|---|---|---|---|---|---|---|---|---|---|---|---|---|---|---|
| | I | | | II | | | III | | | IV | | | V | | |
| Vulcanization time (minutes) | 15 | 30 | 45 | 15 | 30 | 45 | 15 | 30 | 45 | 15 | 30 | 45 | 15 | 30 | 45 |
| Tensile strength (kg./cm.$^2$) | 130 | 139 | 138 | 73 | 135 | 152 | 112 | 163 | 165 | 100 | 118 | 123 | 93 | 147 | 156 |
| Ultimate elongation (percent) | 667 | 532 | 412 | 782 | 614 | 528 | 867 | 624 | 439 | 501 | 454 | 440 | 710 | 528 | 410 |
| Modulus at 150% elongation (kg./cm.$^2$) | 19 | 27 | 38 | 11 | 21 | 28 | 14 | 25 | 40 | 27 | 32 | 34 | 15 | 28 | 42 |
| Modulus at 300% elongation (kg./cm.$^2$) | 45 | 67 | 90 | 22 | 52 | 73 | 25 | 63 | 102 | 57 | 73 | 79 | 30 | 73 | 108 |
| Tear resistance by slit test (kg./cm.) | 26 | 28 | 19 | 18 | 26 | 25 | 25 | 28 | 29 | 18 | 20 | 18 | 20 | 26 | 24 |
| Hardness, Shore A (degrees) | 65 | 70 | 75 | 55 | 62 | 65 | 70 | 71 | 71 | 70 | 70 | 70 | 60 | 70 | 75 |
| Rebound elasticity (percent) | 5 | 6 | 7 | 4 | 5 | 5 | 6 | 6 | 6 | 6 | 6 | 6 | 6 | 7 | 7 |

If, in compositions I, IV and V, 5.0 parts of zinc stearate are substituted for the indicated amounts of zinc oxide, the physical properties of the resulting vulcanizates have values situated between those of compositions II and V.

The values shown in the above table clearly indicate that the vulcanizates obtained in accordance with the invention have excellent physical properties, particularly with regard to tensile strength, ultimate elongation and Shore hardness.

In order to provide a comparison of the advantages of the present process with the results obtained by means of the methods of the prior art, five butyl rubber compositions (VI, VII, VIII, IX and X) were compounded as shown in the following table:

Table III

| Component | Amount of component (parts by weight) in composition— | | | | |
|---|---|---|---|---|---|
| | VI | VII | VIII | IX | X |
| Butyl rubber (Enjay 365) [1] | 100.0 | 100.0 | 90.0 | 100.0 | 100.0 |
| Polychloroprene (Neoprene W) [2] | | | 10.0 | | |
| Chlorosulfonated polyethylene (Hypalon) [3] | | | | 3.0 | 3.0 |
| Channel black | 60.0 | 60.0 | 60.0 | 60.0 | 60.0 |
| Stearic acid | 1.0 | 1.0 | | | |
| Zinc oxide, active | | | | 3.0 | |
| Zinc stearate | | | 5.0 | | 3.0 |
| SnCl$_2$.2H$_2$O | 2.0 | 2.0 | | | |
| Substituted phenol resin (Alresen) [4] | 6.0 | 12.0 | 12.0 | 12.0 | 12.0 |

[1] See Table I.
[2] "Neoprene W" is an elastomer based on polymerized chloroprene.
[3] "Hypalon" is a brand of chlorosulfonated polyethylene.
[4] See Table I.

weight butyl rubber (Enjay 365), 100.0 parts by weight channel black and 1.0 part by weight stearic acid was prepared.

Compositions VI and VII were then compounded as follows: 160.0 parts by weight of butyl rubber were rolled into a smooth sheet on cooled mixing rolls, and then 1.6 parts by weight stearic acid and 24.0 or 48.0 parts by weight, respectively, of substituted phenol resin were worked into the sheet. Thereafter, 482.4 parts by weight of the preliminary mixture and finally 8.0 parts by weight SnCl$_2$.2H$_2$O were worked into the composition. At no time during the compounding procedure was the temperature of the composition allowed to rise above 95° C. The compositions had a great tendency to stick to the mixing rolls and corrode them.

Compositions VIII, IX and X were compounded as follows: The butyl rubber was first admixed with the clorinated elastomer, i.e. with the polychloroprene or the chlorosulfonated polyethylene, on cold mixing rolls until a reasonably smooth sheet was formed. Thereafter, the carbon black, the substituted phenol resin and finally the zinc compound, i.e. zinc oxide or zinc stearate, were worked into the sheet at a maximum temperature of 95° C.

Compositions VI through X were then vulcanized at 150° C. for periods ranging from 15 to 60 minutes, samples were taken from each vulcanizate, and the various samples were subjected to the standard tests to determine their physical properties. The following table shows the values obtained thereby:

Table IV

| Physical properties | Composition |  |  |  |  |  |  |  |  |  |  |  |  |  |  |
|---|---|---|---|---|---|---|---|---|---|---|---|---|---|---|---|
| | VI | | | VII | | | VIII | | | IX | | | X | | |
| Vulcanization time (minutes) | 15 | 30 | 45 | 15 | 30 | 45 | 30 | 45 | 60 | 30 | 45 | 60 | 30 | 45 | 60 |
| Tensile strength (kg./cm.$^2$) | 127 | 143 | 140 | 143 | 152 | 159 | 67 | 98 | 111 | 44 | 81 | 113 | 59 | 86 | 113 |
| Ultimate elongation (percent) | 529 | 471 | 420 | 522 | 480 | 438 | 650 | 608 | 612 | 920 | 842 | 751 | 942 | 772 | 700 |
| Modulus at 150% elongation (kg./cm.$^2$) | 21 | 27 | 31 | 25 | 29 | 33 | 21 | 27 | 29 | 10 | 15 | 21 | 10 | 17 | 21 |
| Modulus at 300% elongation (kg./cm.$^2$) | 59 | 73 | 88 | 68 | 84 | 94 | 33 | 50 | 54 | 15 | 25 | 38 | 17 | 29 | 40 |
| Tear resistance by slit test (kg./cm.) | 25 | 26 | 26 | 23 | 26 | 23 | 18 | 23 | 25 | 13 | 20 | 22 | 11 | 16 | 22 |
| Hardness, Shore A (degrees) | 55 | 59 | 61 | 60 | 62 | 63 | 55 | 61 | 64 | 56 | 61 | 61 | 55 | 60 | 62 |
| Rebound elasticity (percent) | 5 | 5 | 5 | 5 | 5 | 5 | 5 | 5 | 5 | 5 | 6 | 6 | 5 | 6 | 6 |

The advantages which result from the use of the process according to the invention become clearly discernible upon comparison of the test results in Table II with those in Table IV.

Table II shows that compositions with very good vulcanizing characteristics are obtained without the addition of metal halides to the elastomer composition if the heat treatment method according to the present invention is applied. Thus, composition I results in a vulcanizate having a tensile strength of 130 kg./cm.$^2$ after only 15 minutes of vulcanization at 154° C. The use of 1.1 parts zinc oxide and 4.0 parts polyvinyl chloride per 100 parts butyl rubber produces particularly good results. If less than 1.1 parts zinc oxide are used, compositions are obtained which vulcanize more slowly, as illustrated by composition IV. Compositions II and V show that by reducing the amount of polyvinyl chloride or increasing the amount of zinc oxide, the initiation of the vulcanizing reaction can be retarded, which is desirable and often even necessary for certain purposes; whereas vulcanization of these compositions for 15 minutes produces vulcanizates with a tensile strength of less than 100 kg./cm.$^2$, vulcanization of the same compositions for 30 to 45 minutes produces vulcanizates with tensile strengths of up to 156 kg./cm.$^2$.

When 12.0 parts substituted phenol resin are added to the butyl rubber instead of 6.0 parts, the resulting vulcanizate has higher tensile strength, higher ultimate elongation and, in part, lower modulus values, as illustrated by composition III.

None of the compositions I through V had any corrosive effect on the metal parts of the mixing rolls.

In comparison thereto, compositions VI through X, whose physical properties are shown in Table IV and which were compounded by the prior art methods, exhibited considerable shortcomings. Although compositions VI and VII, comprising $SnCl_2.2H_2O$, vulcanize rapidly into products with rather good physical properties, the compounding procedure is difficult because the metal halide renders the compositions tacky so that they are very difficult to manipulate on the mixing rolls. Furthermore, such compositions have a pronounced corrosive effect and rapidly attack not only the metal parts of the mixing apparatus but also the vulcanizing molds, thereby causing permanent damage.

While compositions VIII through X, comprising neoprene or chlorosulfonated polyethylene and zinc oxide or zinc stearate exhibit no corrosive effect upon the mixing rolls or the vulcanizing apparatus, they do not produce reasonably satisfactory vulcanizates until they are vulcanized for at least 45 minutes at 150° C. Longer vulcanization periods produce better vulcanizates, but even with vulcanization periods of 60 minutes at 150° C. the tensile strength is, at best, only 113 kg./cm.$^2$, which is a rather low value. Because of the slow vulcanization rates of compositions VIII through X, changes in their contents of halogen-containing substances or zinc compounds have little effect on their physical properties. For example, composition VIII comprising 10.0 parts polychloroprene does not have any better physical property values than compositions IX and X which comprise only 3.0 parts chlorosulfonated polyethylene.

EXAMPLE II

This example will illustrate that heavy metal compounds other than zinc oxide and zinc stearate may also be used to accelerate the vulcanization of butyl rubber with substituted phenol resins.

The following two butyl rubber compositions (XI and XII) were prepared from the components indicated:

*Table V*

| Component | Amount of component (parts by weight) in composition— | |
|---|---|---|
| | XI | XII |
| Butyl rubber (Enjay 365) | 100.0 | 100.0 |
| Channel black | 60.0 | 60.0 |
| Stearic acid | 1.0 | 1.0 |
| Substituted phenol resin (Alresen) | 6.0 | 6.0 |
| Polyvinyl chloride (Vinoflex 626) | 5.0 | 3.0 |
| Iron formate | 3.0 | |
| Zinc formate | | 2.5 |

The compounding procedure and conditions were the same as those described for compositions I through V in Example I. The compositions were then vulcanized at 154° C. for periods ranging from 15 to 45 minutes, samples were taken from each vulcanizate and each sample was subjected to the standard tests to determine its physical properties. The values obtained from these tests are shown in the following table:

*Table VI*

| Physical properties | Composition | | | | | |
|---|---|---|---|---|---|---|
| | XI | | | XII | | |
| Vulcanization time (minutes) | 15 | 30 | 45 | 15 | 30 | 45 |
| Tensile strength (kg./cm.$^2$) | 132 | 149 | 143 | 92 | 129 | 125 |
| Ultimate elongation (percent) | 574 | 460 | 432 | 633 | 543 | 512 |
| Modulus at 150% elongation (kg./cm.$^2$) | 24 | 34 | 35 | 16 | 22 | 23 |
| Modulus at 300% elongation (kg./cm.$^2$) | 59 | 89 | 90 | 34 | 55 | 60 |
| Tear resistance by slit test (kg./cm.) | 24 | 24 | 23 | 19 | 19 | 20 |
| Hardness, Shore A (degrees) | 65 | 65 | 70 | 56 | 60 | 62 |
| Rebound elasticity (percent) | 6 | 6 | 6 | 5 | 6 | 6 |

EXAMPLE III

This example will illustrate the substantially equivalent vulcanization accelerating effect of chloroparaffin, chlorosulfonated polyethylene and re-chlorinated polyvinyl chloride in vulcanizable butyl rubber compositions comprising substituted phenol resins as vulcanizing agents and zinc oxide.

The following three compositions (XIII, XIV and XV) were prepared from the components indicated:

*Table VII*

| Component | Amount of component (parts by weight) in composition— | | |
|---|---|---|---|
| | XIII | XIV | XV |
| Butyl rubber (Enjay 365) [1] | 100.0 | 100.0 | 100.0 |
| Channel black | 60.0 | 60.0 | 60.0 |
| Stearic acid | 1.0 | 1.0 | 1.0 |
| Substituted phenol resin (Alresen) [2] | 6.0 | 6.0 | 6.0 |
| Zinc oxide, active | 1.1 | 1.1 | 1.1 |
| Chloroparaffin | 4.0 | | |
| Chlorosulfonated polyethylene (Hypalon) [3] | | 4.0 | |
| Re-chlorinated polyvinyl chloride (Rhenoflex) [4] | | | 4.0 |

[1] See Example I.
[2] See Example I.
[3] See Example I.
[4] "Rhenoflex" is a re-chlorinated polyvinyl chloride.

Compositions XIII and XV were compounded in the same manner and under the same temperature conditions as compositions I through V in Example I. In other words, after rolling the butyl rubber into a smooth sheet and adding the stearic acid, the carbon black, the re-chlorinated polyvinyl chloride and the zinc oxide, the compositions were removed from the cold mixing rolls, the rolls were heated to 185° C., and the compositions were placed on the hot rolls and rolled a temperature of 190 to 195° C. for about 7 minutes. The hot-rolled compositions were then removed from the mixing rolls, allowed to cool, and then the substituted phenol resin vulcanizing agent was incorporated on cold mixing rolls.

Composition XIV was compounded in the same manner, except that the hot-rolling temperature prior to the addition of the substituted phenol resin was between 165 and 170° C. and the hot-rolling time was 10 minutes.

For purposes of comparison, three additional compositions XIII-A, XIV-A and XV-A were compounded from the same ingredients in the same ratios as compositions XIII, XIV and XV, respectively. However, the hot-rolling treatment prior to the addition of the substituted phenol resin was omitted altogether; in other words, composition XIII-A, XIV-A and XV-A were compounded entirely on unheated mixing rolls.

After compounding compositions XIII, XIII-A, XIV, XIV-A, XV and XV-A in the manner described above, each of them was vulcanized at 154° C. for 30 minutes, samples were taken from each vulcanizate and each sample was subjected to the standard tests to determine its physical properties. The following table shows the values obtained from these tests:

Table VIII

| Physical properties | Composition | | | | | |
|---|---|---|---|---|---|---|
| | XIII | XIII-A | XIV | XIV-A | XV | XV-A |
| Tensile strength (kg./cm.$^2$) | 123 | 40 | 129 | 33 | 111 | 31 |
| Ultimate elongation (percent) | 700 | 883 | 421 | 1079 | 738 | 780 |
| Modulus at 150% elongation (kg./cm.$^2$) | 15 | 7 | 40 | 12 | 15 | 7 |
| Modulus at 300% elongation (kg./cm.$^2$) | 35 | 10 | 87 | 14 | 31 | 10 |
| Tear resistance by slit test (kg./cm.) | 28 | 10 | 28 | 8 | 28 | 10 |
| Hardness, Shore A (degrees) | 54 | 47 | 77 | 65 | 62 | 47 |
| Rebound elasticity (percent) | 4 | 5 | 10 | 7 | 5 | 5 |

The surprising advantages of the process according to the present invention may readily be recognized from an examination of the values tabulated above. For example, compositions XIII, XIV and XV compounded by the method of the present invention produce vulcanizates which have about three times as high a tensile strength, modulus at 300% elongation and tear resistance than the vulcanizates obtained from the corresponding compositions XIII-A, XIV-A and XV-A compounded by methods which omit the heat treatment prior to the addition of the substituted phenol resin.

EXAMPLE IV

In order to clarify the question whether the particular metal chloride is merely formed under the compounding conditions of the process according to the invention or whether a different effect is achieved, four additional vulcanizable butyl rubber compositions (XVI, XVII, XVIII and XIX) were prepared from the components indicated in the following table:

Table IX

| Component | Amount of component (parts by weight) in composition— | | | |
|---|---|---|---|---|
| | XVI | XVII | XVIII | XIX |
| Butyl rubber (Enjay 365) | 100.0 | 100.0 | 100.0 | 100.0 |
| Carbon black | 60.0 | 60.0 | 60.0 | 60.0 |
| Stearic acid | 1.0 | 1.0 | 1.0 | 1.0 |
| SnCl$_2$.2H$_2$O | 1.5 | 2.0 | 1.5 | 2.0 |
| Substituted phenol resin (high vulcanizing action) | 3.0 | 3.0 | 3.0 | 3.0 |

Compositions XVI and XVII were compounded as follows, using the process according to the present invention: The butyl rubber, the carbon black, the stearic acid and the stannous chloride were admixed and rolled into a smooth sheet on cooled mixing rolls. Thereafter, the mixing rolls were heated and the butyl rubber sheet was rolled for 10 minutes at 200° C. After allowing the sheet to cool, the substituted phenol resin was worked in on cooled mixing rolls.

Compositions XVIII and XIX were compounded in the same manner, except that the heat treatment prior to incorporation of the substituted phenol resin was omitted.

After these compounding procedures, each of the resulting vulcanizable butyl rubber compositions was vulcanized at 155° C. for 30 to 45 minutes. Samples were taken from each vulcanizate, and these samples were subjected to the standard tests for determination of their physical properties. The following table shows the values obtained from these tests:

Table X

| Physical properties | Composition | | | | | | | |
|---|---|---|---|---|---|---|---|---|
| | XVI | | XVII | | XVIII | | XIX | |
| Vulcanization time (minutes) | 30 | 45 | 15 | 45 | 30 | 45 | 15 | 45 |
| Tensile strength (kg./cm.$^2$) | 116 | 120 | 119 | 130 | 68 | 76 | 70 | 88 |
| Ultimate elongation (percent) | 482 | 472 | 481 | 421 | 455 | 457 | 456 | 389 |
| Modulus at 150% elongation (kg./cm.$^2$) | 21 | 22 | 21 | 27 | 21 | 24 | 21 | 28 |
| Modulus at 300% elongation (kg./cm.$^2$) | 58 | 63 | 59 | 80 | 44 | 48 | 43 | 64 |
| Tear resistance by slit test (kg./cm.) | 22 | 19 | 19 | 19 | 14 | 13 | 14 | 18 |
| Hardness, Shore A (degrees) | 52 | 54 | 53 | 56 | 59 | 60 | 55 | 60 |
| Rebound elasticity (percent) | 6 | 6 | 6 | 6 | 6 | 7 | 6 | 6 |

If the effects produced by the process according to the present invention were merely the formation of a particular metal halide, the vulcanization of compositions XVI and XVII as well as XVIII and XIX, which contain the same amounts of SnCl$_2$.2H$_2$O, respectively, would produce vulcanizates with substantially identical properties. However, the above tabulation clearly demonstrates that compositions XVI and XVII, compounded in accordance with the present invention, produce distinctly better vulcanizates with higher ultimate elongations; the properties of these vulcanizates correspond approximately to those of composition IV in Example I. The relatively poor tensile strength values of compositions XVIII and XIX, i.e. vulcanizates produced from butyl rubber compositions compounded in accordance with the prior art method, were to be expected because only 3.0 parts of phenol resin per 100 parts of butyl rubber were used.

The above comparative tests clearly indicate that the effects produced by the compounding process according to the present invention far exceed the mere vulcanization-accelerating effect of a metal halide. Surprisingly good physical property values are obtained which demonstrate a substantial, unexpected technical advance.

While I have illustrated by invention with the aid of certain specific embodiments thereof, it will be readily apparent to those skilled in the art that my invention is not limited to these embodiments and that various changes and modifications may be made without departing from the spirit of the invention or the scope of the appended claims.

I claim:

1. In a method of compounding a vulcanizable composition of a rubbery copolymer of an isoolefin having from 4 to 7 carbon atoms with from 0.5 to 10% of an aliphatic conjugated diolefin having from 4 to 14 carbon atoms, said composition comprising in addition to said rubbery copolymer, as a vulcanizing agent, a substituted phenol resin obtained by condensation of a p-hydrocarbon substituted phenol with formaldehyde under alkaline conditions and, as vulcanization accelerators, a halogen donor and a metal compound selected from the group consisting of oxides and fatty acid salts of zinc and iron, the improvement which comprises incorporating said metal compound and said halogen donor into said rubbery copolymer, heating the resulting composition to a temperature above 120° C., and thereafter adding the substituted phenol resin.

2. In a method of compounding a vulcanizable composition of a rubbery copolymer of an isoolefin having from 4 to 7 carbon atoms with from 0.5 to 10% of an aliphatic conjugated diolefin having from 4 to 14 carbon atoms, said composition comprising in addition to said rubbery copolymer, as a vulcanizing agent, a substituted phenol resin obtained by condensation of a p-hydrocarbon substituted phenol with formaldehyde under alkaline conditions and, as vulcanization accelerators, a halogen donor and a metal compound selected from the group consisting of oxides and fatty acid salts of zinc and iron, the improvement which comprises incorporating said metal compound and said halogen donor into said rubbery copolymer, heating the resulting composition to a temperature from 120° C. to 220° C. for two to twenty minutes, and thereafter adding the substituted phenol resin.

3. In a method of compounding a vulvanizable composition of a rubbery copolymer of an isoolefin having from 4 to 7 carbon atoms with from 0.5 to 10% of an aliphatic conjugated diolefin having from 4 to 14 carbon atoms, said composition comprising in addition to said rubbery copolymer, as a vulcanizing agent, a substituted phenol resin obtained by condensation of a p-hydrocarbon substituted phenol with formaldehyde under alkaline conditions and, as vulcanization accelerators, a halogen donor and a metal compound selected from the group consisting of oxides and fatty acid salts of zinc and iron, the improvement which comprises incorporating said metal compound and said halogen donor into said rubbery copolymer, heating the resulting composition to a temperature above 120° C., allowing the hot composition to cool, and thereafter adding the substituted phenol resin.

4. In a method of compounding a vulcanizable composition of a rubbery copolymer of an isoolefin having from 4 to 7 carbon atoms with from 0.5 to 10% of an aliphatic conjugated diolefin having from 4 to 14 carbon atoms, said composition comprising in addition to said rubbery copolymer, as a vulcanizing agent, a substituted phenol resin obtained by condensation of a p-hydrocarbon substituted phenol with formaldehyde under alkaline conditions and, as vulcanization accelerators, a halogen donor selected from the group consisting of polyvinylchloride, polychloropropene and chlorosulfonated polyethylene and a metal compound selected from the group consisting of oxides and fatty acid salts of zinc and iron, the improvement which comprises incorporating said metal compound and said halogen donor into said rubbery copolymer, heating the resulting composition to a temperature from 120° C. to 220° C. for two to twenty minutes, and thereafter adding the substituted phenol resin.

5. In a method of compounding a vulcanizable composition of a rubbery copolymer of an isoolefin having from 4 to 7 carbon atoms with from 0.5 to 10% of an aliphatic conjugated diolefin having from 4 to 14 carbon atoms, said composition comprising in addition to said rubbery copolymer, as a vulcanizing agent, a substituted phenol resin obtained by condensation of a p-hydrocarbon substituted phenol with formaldehyde under alkaline conditions and, as vulcanization accelerators, a halogen donor selected from the group consisting of polyvinylchloride, polychloropropene and chlorosulfonated polyethylene and a metal compound selected from the group consisting of oxides and fatty acid salts of zinc, the improvement which comprises incorporating said metal compound and said halogen donor into said rubbery copolymer, heating the resulting composition to a temperature from 120° C. to 220° C. for two to twenty minutes, and thereafter adding the substituted phenol resin.

References Cited by the Examiner

UNITED STATES PATENTS

| | | | |
|---|---|---|---|
| 2,715,650 | 8/55 | Doak | 260—23.7 |
| 2,734,039 | 2/56 | Peterson et al. | 260—19 |
| 2,955,102 | 10/60 | Clayton et al. | 260—23.7 |
| 2,964,493 | 12/60 | Hakala et al. | 260—846 |
| 2,985,608 | 5/61 | Higgins et al. | 260—19 |

FOREIGN PATENTS 1,004,371  3/57  Germany.

LEON J. BERCOVITZ, *Primary Examiner.*

A. D. SULLIVAN, MILTON STERMAN, DONALD E. CZAJA, *Examiners.*